Figure 1:
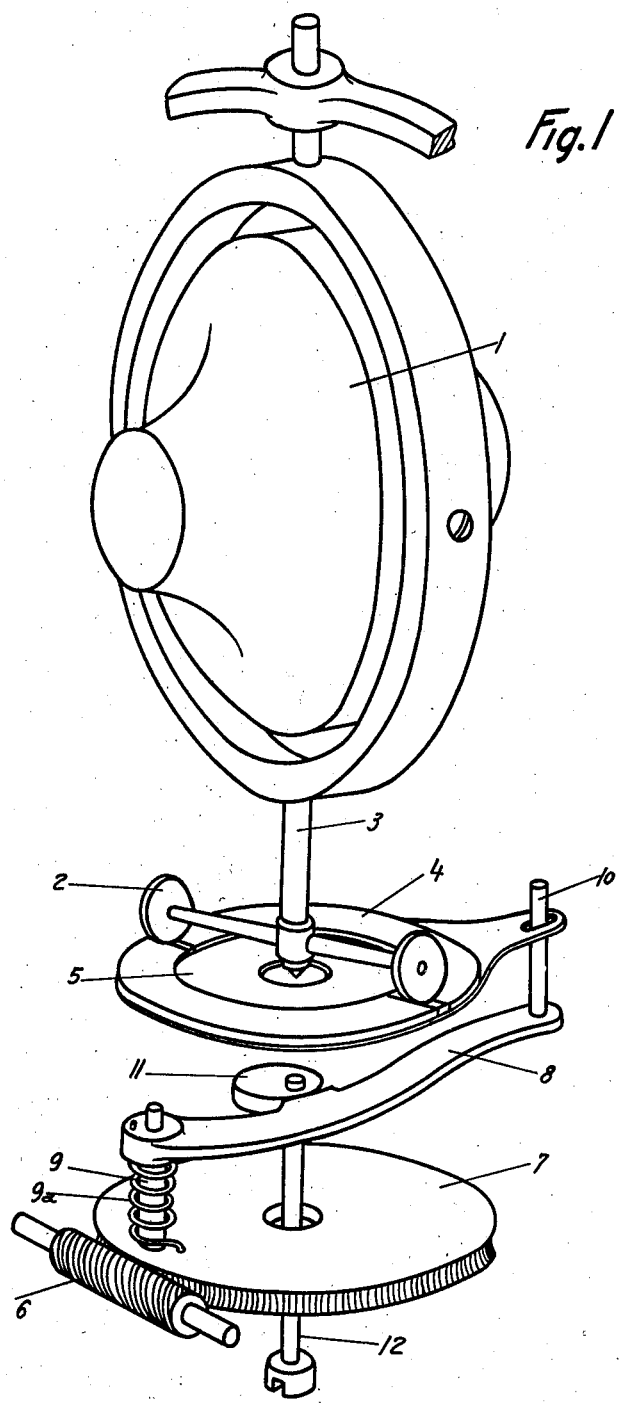

June 27, 1939.     R. ALKAN     2,163,724
METHOD OF AND MEANS FOR CONTROLLING APPARATUS
Filed June 10, 1935     3 Sheets-Sheet 3
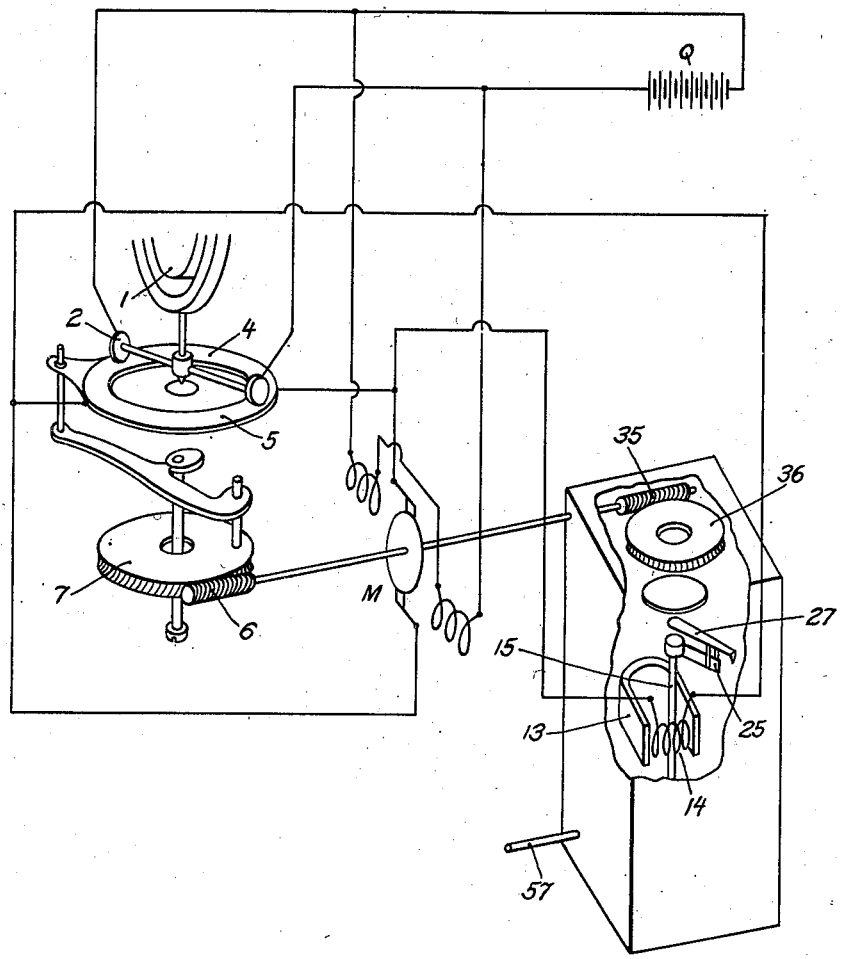
INVENTOR.
Robert Alkan
BY Stephen Cerstvik
ATTORNEY.

UNITED STATES PATENT OFFICE 2,163,724

METHOD OF AND MEANS FOR CONTROLLING APPARATUS

Robert Alkan, Paris, France

Application June 10, 1935, Serial No. 25,952
In France November 27, 1934

15 Claims. (Cl. 114—144)

The invention relates to methods of and means for automatically controlling vessels, aircraft and the like.

It is known that any improved system of automatic control of control surfaces of an aircraft must take into account at every moment and for each of the three reference axes of the craft, not only the angle of the deviation, i. e., the angle a given axis of reference makes with a desired position or direction of equilibrium in which this axis is to be stabilized, but also the speed of the deviation, i. e., the speed of angular movement of said reference axis relative to said desired position or direction of equilibrium. Considering for instance, the turning movement of an aircraft towards the direction of a desired heading in the horizontal plane, this movement may be rendered similar to a damped periodic movement, provided there are applied to the craft, a directive or restoring torque proportional at every moment to the instantaneous value of the angle of deviation existing between the longitudinal axis of the craft and the direction of the desired heading and a damping torque proportional at every moment to the instantaneous value of the angular speed of turning movement of the craft.

Automatic controls in which both controlling torques mentioned above are produced by the aerodynamic reaction of a single control surface suitably actuated are already known and the object of the present invention is to provide an improved system of automatic control for a control surface of an aircraft, vessel or the like, whereby the proper setting is imparted to said surface at all times to cause the craft to keep or return, after a deviation, to its desired position or direction of equilibrium in the best conditions of stability and damping.

In this arrangement the manual power usually required from the pilot to operate the controls is effected electrically by a servo-motor controlled by means such that at any moment the electric power which causes its rotation is automatically graduated to obtain exactly the desired setting of the controls.

The means employed to obtain this graduation of power consists essentially in controlling a relay by an electromotive force itself proportional to the speed of veering and to the action of a control spring itself controlled by the angle of deviation. According to the invention a method of automatically controlling vessels, aircraft and the like is provided which consists in creating alternate electromotive forces the time integral of which is a function of the angle which the aircraft or the like makes with a predetermined direction, and of the speed of veering from this direction, and of using these for controlling the servo-motor operating the controls of the aircraft or the like, the electromotive forces controlling the servo-motor being rendered dependent also on the movements which this latter imposes on the controls of the aircraft or the like.

Means for carrying out this method comprise a member defining the desired or reference direction and an element connected with the aircraft or the like, these two members being driven one in relation to the other by a relative oscillatory movement constant in amplitude and independent of their veering, the relative movement of these being used to produce an alternating electromotive force, the time integral of which is in proportion to the speed of veering.

Accordingly, one of the objects of the invention is to provide alternating electromotive forces of which the mean value is proportional to, respectively, the angles which the airship makes with a determined direction and of the speed of veering off from its course.

Another object is to provide novel means whereby there is applied to the terminals of the servo-motor alternate pressures, the mean values of which are proportional to the algebraical sum of the electromotive forces hereinabove defined.

Still another object is to provide novel means whereby the electromotive forces which are applied to the servo-motors are dependent on the movement which the latter impose on the controls of the airship.

A further object is to provide novel means whereby there are provided alternating electromotive forces of which the mean values are proportional to the angle which a directional gyro or the like makes with an element connected with the orientation of the airship and to use their relative movement to manipulate the means for graduating the electric power effecting the rotation of the servo-motor in terms of the veering angle.

Another object is to provide novel means for providing alternating electromotive forces, the mean value of which is proportional to the speed of veering, measured by a directional gyro member or the like defining the direction of reference and a movable member controlled by the gyro, these two members being relatively actuated with a permanent oscillatory relative movement, which is independent of their orientation or veering, and to use this relative movement to operate the means graduating the electric power, causing the rotation of the servo-motor to take place in terms of the speed of the veering off from the initial position.

Still a further object is to provide novel means whereby there is provided for application to a servo-motor, an electromotive force proportional to the algebraic sum of an electromotive force proportional to the amount of deviation and an electromotive force proportional to the rate of deviation, said means including a galvonometer-type relay comprising relatively stationary and movable parts, means for applying to said movable part an electromotive force proportional to the rate of deviation and means for modifying the movement of said part by a force proportional to the amount of deviation.

Figure 2:
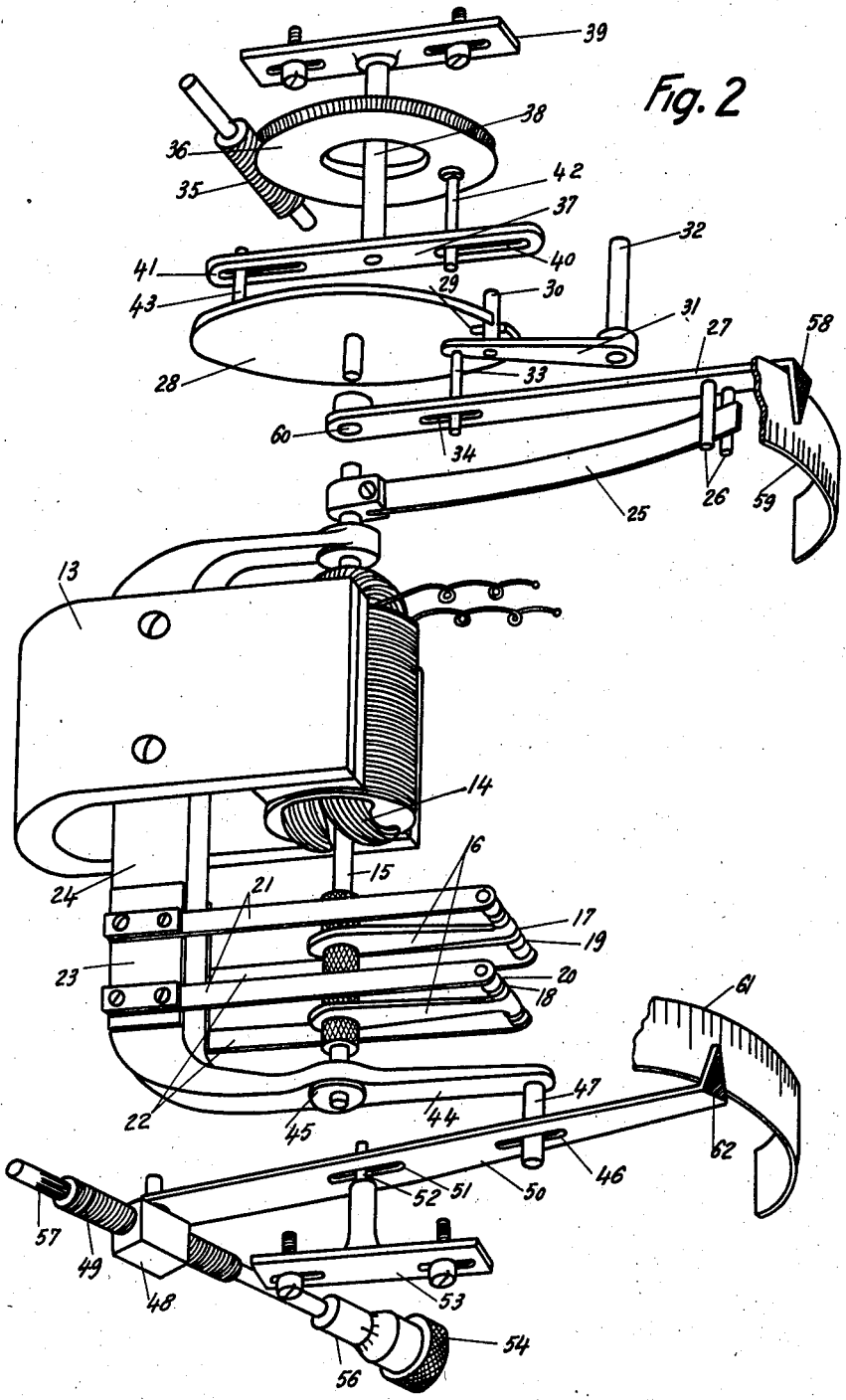

By way of example, a device constructed in accordance with the invention is shown in diagrammatic perspective view in Figures 1, 2 and 3 of the accompanying drawings.

According to the invention, there is first arranged in accordance with a known method, a directing organ or member serving to define the direction of reference by means of a compass or by a gyroscopic indicator, which latter is preferably arranged with two degrees of liberty of rotation corrected for its accidental precessions as has already been proposed, by combination with a magnetic compass.

This gyroscope is provided with suitable means controlled by it such as a pair of rollers 2 carried by an arm integral with the axis 3 of the gyroscope suspension. These two rollers bear on two semi-circular strips 4 of conducting material carried by an insulating disk 5. By these means, it is possible, by connecting the rollers 2 to a source of electrical energy and the strips 4 to the brushes of an electric motor, independently excited, as illustrated in Fig. 3 to cause the disk 5 to always assume the same position, relative to the gyro.

Nevertheless, instead of proceeding in this usual way, one interpolates between the tangential screw 6 and the plate 5, suitable members to oscillate in a permanent manner and independent of its orientation, this movable member 5 in relation to the gyroscope which defines the direction of reference.

For this purpose an auxiliary plate 7 is acted upon by the tangential screw 6 said auxiliary plate 7 being connected to the plate 5 by a rocker 8 articulated on a pin 9 carried by the plate 7 while a stud 10 will engage in a hole pierced in the plate 5. The rocker 8 will bear continuously on a cam 11 through the action of a spring 9ª. The cam 11 is caused to rotate with a continuous movement by means of the axle 12 driven by an auxiliary motor not shown.

The operation of such a mechanism is as follows:

When the control has reached a state of equilibrium the insulation elements which separate the strips 4 are aligned with the rollers 2 and the oscillation which is given them by the rocker 8 is such that the contact between the roller and the strips takes place alternately to right and left in an equal manner and symmetrically. The electromotive energy collected by the strips 4 is therefore alternate and at the frequency imposed by the cam 11 and the alternations are of equal value. The electromotive force which results in the circuit of the control motor for the gyroscope which is connected to the strips 4 has therefore a mean value of zero and the motor oscillates but does not rotate.

When on the contrary the control is not under equilibrium, for example when the airship is turned, the gyroscope retains its orientation, and the rollers 2 are no longer aligned with insulation elements of the strips 4. Through this dissymetry, during an oscillation of the plate 5 the energy is applied by the rollers to the strips for less than half period in one direction and for more than a half period in the opposite direction. The alternations of the energy collected on the strips 4 are therefore no longer of equal value and the electromotive force which results therefrom in the circuit of the motor controlling the gyroscope no longer has a mean value of zero so that the motor commences to rotate to catch up the difference due to the veering of the airship. As long as the amplitude of the permanent oscillation of the disk 5 is notably greater than the amplitude of deviation, the resulting mean electromotive force is very sensibly proportional to the speed of veering of the airship.

Further, a galvanometric relay is constructed by means of a magnet 13 (Fig. 2) or by an electro-magnet and a coil 14 oscillating about the spindle 15 to which is applied the alternate electromotive force, obtained from the arrangement above described, the mean value of which is proportional to the speed of veering of the airship.

There are rendered integral with the spindle 15 of the coil 14 the oscillating parts of a reversing switch consisting of two insulated arms 16 carrying contact studs such as 17 and 18 which can alternately bear on the corresponding studs such as 19 and 20, with which the conducting blades such as 22 and 21 are furnished, the latter being secured to an insulating part 23 which is itself held by a support 24 common to this part and to the magnetic circuit 13.

A return couple for the coil is created by rendering its spindle 15 integral with a spring blade 25 which is guided by means of two stops 26 carried by an arm 27 articulated at 60 co-axially to the frame. The arm 27 is displaced by a disk 28 in which is cut a radial slot 29 in which engages a stud 30 carried by an auxiliary lever 31 articulated on the axis 32 and carrying the counterstud 33 which will engage in the slideway 34 of the arm 27.

The disk 28 is intended to be driven (for instance by a flexible shaft) by an extension of the spindle of the tangential screw 6 (Fig. 1) of the drive of the control for the gyroscope as shown in Fig. 3. In order to permit the regulation at will of the factor of proportionality, there will be supplied a spindle 38 in addition to a second tangential screw 35 driving a crown wheel 36 communicating its movement to the plate 28 through the intermediary of a variable speed arm 37. Said spindle 38 is adjustable by means of a graduated slide 39, said arm 37 receiving in its slideways 40 and 41 the studs 42 and 43 which are respectively integral with the crown wheel 36 and the plate 28.

The zero adjustment of the galvanometric relay is produced by causing support 24 and magnet 13 to rotate about the spindle 15 of the coil 14 and also that part of the reversing switch formed by the insulating part 23 and the blades 21 and 22. For this purpose, the support 24 is extended by an arm 44 trunnioned at 45 co-axially with the coil 14, the arm 44 is provided with a stud 47 driven by the slideway 46, of a lever 50 trunnioned itself by sliding around a pin 52 carried by an adjustable slide 53. This lever 50 is itself driven by the displacement of the nut 48 of a screw 49.

The screw 49 is driven by means of its grooved spindle 57 by a flexible drive, connected to the servo-motor of the controls. A milled knob 54 screwing on to a socket 57 and connected to the spindle 56 permits the longitudinal displacement of the screw 49 to be regulated for adjusting, at will, the mean displacement of the lever 50. This lever 50, as well as the lever 27 will be provided with indexes 62 and 58 which will move in front of graduated scales 61 and 59 intended to facilitate the adjustment of the device The mechanical and electrical connections between the apparatus shown in Figs. 1 and 2 are arranged as shown in Fig. 3. The motor M, which drives the two tangential screws 6 (Fig. 1) and 35 (Fig. 2) mounted on a common shaft, is controlled by the system shown in Fig. 1. The armature winding of the motor M is connected in parallel in relation to the windings of the relay 13—14—15 and is electrically connected to the strips 4. The motor M is excited independently by electric current created by the battery Q. This battery on the other hand is connected to the rollers 2.

The rotation of this motor M is effected by an electromotive force (or an alternating current) produced at the strips 4 by the angular displacement of the dividing pieces of these strips in relation to the position of the rollers 2, that is to say, proportional to the speed of this displacement.

The speed of rotation of the motor M is therefore proportional to this electromotive force which itself is proportional to the speed of veering of the aircraft, as long as the amplitude of the permanent oscillation of the disc 5 is considerably greater than the angular deviation of the aircraft on its course which actually occurs most frequently in practice.

On the one hand this electromotive force (that is to say) the corresponding alternating current proportional to the angular speed of deviation of the aircraft is transmitted to the relay 13—14 to produce an angular displacement of the spindle 15.

On the other hand this spindle 15 is subjected by the intermediate action of a system of levers, arms and discs (25—27—28—42—36) to a force proportional to the angle of deviation of the aircraft. This is explained by the fact that the total displacement of the motor M corresponding to this angle of deviation, which is the integral of the differential of the angular displacement according to the time, that is to say, of the speed, is transmitted to the tangential screw 35, which itself transmits this movement to the mechanical system 36—42—37—43—28—30—31—33—26—25. It is obvious now that the electromotive force proportional to the angular speed of the deviation and another force corresponding to the angle of deviation of the aircraft on the course, are superposed on the spindle 15 of the galvanometric relay.

The galvanometric relay thus constituted operates in the following manner:

It will be seen that the strips 4 (Fig. 1) of the gyroscope control cause in their oscillation, an alternating electromotive force, the mean value of which is a function of the speed of veering of the craft.

If this alternating current is applied, either directly or through the intermediary of a relay, to the coil 14 (Fig. 2) the latter will be subjected to an alternating couple and will oscillate about the position of equilibrium governed by the resiliency and position of the spring blade 25.

In its movement, the coil 14 drives the insulated arms 16 of the reversing switch. If these arms are connected to the poles of a battery, there will be collected in the circuit connected to the blades such as 21 and 22 (presumed to be connected diagonally as in the case of ordinary reversing switches) a resulting alternating electromotive force, of a form analogous to that which is applied to the coil 14. Not only is this resulting electromotive force synchronous to that applied to the coil but it is proportional thereto in amplitude and mean resultant value, by reason of the value of the electro-magnetic forces exerted by the coil. The electromotive force which results, coming from the galvanometric relay will in this case certainly be a function of the speed of veering of the airship.

It is also a function of the angle of deviation, as will be subsequently seen. In fact when the airplane has deviated from its route and veered through an appreciable angular deviation, the crown 36 (driven by the screw 35 actuated by the control motor of the gyroscope) has retained its position which it had originally in relation to the earth. The slot 29 of the plate 28 is no longer opposite the axis 32 of the lever 31. This results in a displacement of this latter and a corresponding rotation of the arm 27 around its axis 60. The two guides 26 have therefore moved taking along the spring blade 25. This results in dissymmetrical operation of the reversing switch 16. With a very low speed of deviation the alternate tension applied to the coil 14 may be considered as having an average of zero and the action of spring 25 due to the amount of deviation develops in the circuits connected to the blades 21 and 22, an alternate electromotive force, the mean value of which is practically proportional to the amount of deviation from the route when these latter are fairly small. When the alternate tension applied to the coil 14 does not have an average of zero the resultant electromotive force due to the simultaneous action of the two influences under consideration is practically proportional to the algebraical sum of the electromotive forces due to the angle of deviation and the speed of deviation affected by suitable coefficients which depend on the mechanical characteristics of the spring and electro-magnetic characteristics of the galvanometric system. It is this resultant electromotive force which controls the current to the servo-motor actuating the controls of the airship directly.

When the plate 28 has turned in relation to the airship through a predetermined angle which is not very small, the stud 30 escapes from the groove 29 and rests on the periphery of the plate 28 the arm 27 remaining stationary at the position corresponding to said predetermined angle. This results in that the maximum amplitudes of the movements of the arm 27 is limited to a suitable value.

To understand the operation of the whole device, it is necessary in the first place to consider that the movements of the axis 15 of the coil are proportional to the turning movement which it is desired to apply to the rudder.

If one then considers the operation of the device after the aircraft has turned to a direction slightly different than that to which the control is adjusted, there is produced a displacement of the stud 30 by the plate 28 which causes a displacement of the spring 25 by its guides 26, that is to say a first turning movement which is a function of this deviation.

From this turning movement there is produced by the aircraft controls a return movement of the craft back to its original direction which is immediately translated into a dis-symmetrical action of the alternate electromotive force applied on the coil 14 by reason of the angular displacement of the mean position of the strips 4 and the rollers 2. The mean value taken by this electromotive force develops a couple between the coil 14 and the field magnet 13; the result due to this couple adding algebraically to that resulting from the displacement of the guides 26 for the spring 25 so as to produce another turning movement.

This effect of the rotation of the airship results in the case under consideration, in diminishing the amount of rudder applied and in this way limits the speed of veering. At the moment when the airship, during its turning, comes very close to the desired direction, the slit 29 comes again opposite the axis 32 and the spring 25 no longer pulls the coil out of its median position. The switch 16 is therefore subjected only to the influence of the electromotive force due to the speed of the return movement; this latter acting alone on the controls imposes on them a counter-turning movement which prevents the airship from sensibly passing by the heading desired.

When it is desired to effect a change of direction, it is advantageous to introduce an angular displacement between the plate 7 (Fig. 1) and the plate 28 (Fig. 2) for example by means of a differential installed on the transmission which unites the tangential screws 6 and 35. Up to now one has only considered the movements of the axis 15 as being proportional to the turning movements which it was desired to impose on the controls.

It is also desirable to make the movements of the spindle 15 dependent upon the movements that have been impressed upon the controls. This is accomplished in the following manner.

The rotation of the servo motor is transmitted to the screw 57 whereby the lever 50 indicates the movements of the rudder which are marked up on the graduation 61 by the index 62. The lever 50 actuates the support 24 which carries the magnetic circuit 13 and the blades 21 and 22 of the reversing switch and causes this assembly to turn through an angle which is equal to the angle through which the median position of the coil has itself turned.

It is advantageous to be able to vary at will the factor of proportionality of this control of position. This can be obtained by displacing the slide 53 which thereby varies the relation of the arms of the levers 48—52 and 52—47.

In a similar manner it is posible to vary the influence of the deviations from the desired direction by altering the adjustment of the slide 39 which determines the relation of the arms of the levers 42—38 and 38—43.

Other means for adjusting the whole of the device are provided by altering for instance, by means of rheostats, the intensities of the current in the coil and in the servo-motor.

The whole of these means of adjustment therefore help ensure the stability of the heading and the suitable damping of the oscillations about this heading in spite of the differences in the flying characteristics of the various craft.

In the case where the airship should itself be out of adjustment, as for instance through a defect in symmetry or a lack of evenness between the propelling motors, there will result a tendency to deviate and the controls will have to be kept actuated to turn the rudder which will be indicated on the scale 61 and there will be a co-relative variation of the heading which will be indicated on the scale 59. It will then be possible to bring back the arrangement to the conditions of normal working by bringing back the index 62 towards its original mean position by a longitudinal displacement of the screw 49 by means of the milled nut 54 which is graduated and the rotation of which measures the amount of the lack of adjustment of the airship, thus corrected. This correction corresponds with the amount of rudder applied which in such case ensures rectilinear travel.

In other words, if the gyratory movement of the airplane is compared with a damped periodic movement, this movement will be entirely defined by the functions of this mechanism which allows of proportioning at any moment the sums of the directing couples and the damping couples to the inertia couples and the disturbing couples and thus renders possible the obtaining of the desired degree of damping.

The invention is not limited to the methods of application and to the forms of construction which have been described; it covers all variations especially those where, instead of applying the device to the stabilization of the airship in a direction with reference to a given point, it is applied to the stabilization of its longitudinal or transverse inclination movements or again to the simultaneous stabilization of the movements about two or about its three main axes.

I claim:

1. In an automatic piloting device, a conmutator member, means for continuously oscillating said member, a contact member cooperating with said commutator, a directional gyroscope connected to and positioning said contact member, electric connections to said contact member and commutator member whereby oscillation of said commutator member will produce periodic alternating electromotive power in the connections to the commutator.

2. In an automatic piloting device, a commutator member comprising a disc having two opposed semi-circular commutator segments, means for continuously oscillating said member, a contact member including an element mounted concentric with said commutator segments and having a pair of trolley wheels mounted on said element in diametrically opposed position and spaced to cooperate with said commutator segments, a directional gyroscope connected to and positioning said contact member, electric connections to said trolley wheels and said commutator segments whereby oscillation of said commutator member will produce periodic alternating electromotive power in said connections to the commutator segments.

3. In an automatic piloting device, a commutator member, means for oscillating said member including a continuously driven cam, a manually adjustable member, a lever pivotally mounted on said manually adjustable member, biasing means forcing said lever into contact with said cam, means connecting said lever to said commutating member whereby the commutator member will be continuously oscillated, a contact member cooperating with said commutator member, a directional gyroscope connected to and positioning said contact member, and electrical connections to said contact member and commutator member whereby periodic alterations of the electromotive forces in the commutator will be produced by the oscillations of the commutator member.

4. In an automatic control system for a dirigible craft including means for controlling the orientation of said craft about a given axis thereof, the combination of means responsive to the deviation of said craft about said axis for producing a force proportional to said deviation, means modifying said force whereby a force proportional to the rate of said deviation is obtained, means whereby said last force is applied to said control means, and means responsive to the movement of said control means for modifying said last named force.

5. In an automatic control system for a dirigible craft including means for controlling said craft, means producing an alternating force the average value of which is proportional to the rate of deviation of said craft, means for applying said force to said control means for movement thereof and means responsive to the movement of said control means whereby said force is modified.

6. The method of automatically controlling the attitude of a craft which comprises, creating alternating forces the average value of which is proportional to the rate of deviation of said craft, applying said forces to the control element of said craft whereby the amount of control applied to said craft is determined, and modifying the amount of said force in proportion to the amount of control so applied.

7. The method of automatically controlling the attitude of a craft which comprises, creating a force proportional to the rate of deviation of said craft, modifying said force by opposing the same by a force proportional to the amount of deviation of said craft, applying said modified force to the control element of said craft and further modifying said last named force in proportion to the movement of said control element.

8. In a device of the character described, means responsive to the deviation of a craft for producing a force proportional to the amount of said deviation, oscillating means so modifying said force that a force proportional to the rate of said deviation is thereby obtained, the amplitude of oscillation of said oscillating means being relatively greater than the amplitude of deviation and independent of said deviation.

9. In a device of the character described, means producing an electrical force proportional to the rate of deviation of a craft, a galvanometer type relay, means for applying said electrical force to said relay, means controlled by said relay for determining the force applied in controlling said craft, variable power means restraining the movement of the movable element of said relay and means for modifying the amount of said power in proportion to the amount of deviation of said craft whereby the force applied in controlling said craft is proportional to the amount of said deviation and the rate of said deviation.

10. In a device of the character described, a direction maintaining element, means responsive to the deviation of a craft cooperating with said element to produce a force proportional to the amount of said deviation, means continuously oscillating said responsive means whereby said force is modified, a relay comprising a relatively stationary part and a movable part, means for applying said force to the movable part of said relay for movement thereof, power means controlled by said movement, resilient means opposing the movement of said part with a force proportional to the amount of deviation of said craft, control means actuated by said power means and means responsive to the movement of said control means for modifying the position of said relatively stationary part.

11. In a device of the character described, a direction maintaining element, means responsive to the deviation of a craft cooperating with said element to produce a force proportional to the amount of said deviation, means continuously oscillating said responsive means whereby said force is modified, a relay comprising a relatively stationary part and a movable part, means for applying said force to the movable part of said relay for movement thereof, power means controlled by said movement, resilient means opposing the movement of said part with a force proportional to the amount of deviation of said craft, means for adjusting the proportionality factor of said force, control means actuated by said power means, means responsive to the movement of said control means for modifying the position of said relative stationary part in proportion to said movement and means for varying the proportionality factor of said modifying means.

12. In a gyroscopic device, a commutator member, a contact member cooperating with said commutator member, means for causing relative continuous oscillatory motion between said commutator member and said contact member, a directional gyroscope connected to and positioning one of said members and electrical connections to said commutator member and said contact member whereby said oscillation will produce a periodically alternating electrical power in one of said connections.

13. In a device of the character described, means responsive to the deviation of a craft for producing a force proportional to the amount of said deviation, oscillating means so modifying said force that a force proportional to the rate of said deviation is thereby obtained, the amplitude of oscillation of said oscillating means being relatively greater than the amplitude of deviation and independent of said deviation, follow-up means, a galvanometer-type relay, means for applying said force proportional to the rate of deviation to both said follow-up means and said relay, and means controlled by said follow-up means for modifying the action of said relay in proportion to the amount of said deviation.

14. In a device of the character described, means producing an electrical force proportional to the rate of deviation of a craft, a galvanometer-type relay, means controlled by said relay for determining the force applied in controlling said craft, variable power means restraining the movement of the movable element of said relay, means including follow-up means for modifying the amount of said power in proportion to the amount of deviation of said craft, and means for applying said force proportional to the rate of deviation of said craft to both said follow-up means and said galvanometer relay whereby the force applied in controlling said craft is proportional to the amount of said deviation and to the rate of said deviation.

15. In a device of the character described, means producing an electrical force proportional to the rate of deviation of a craft, a galvanometer-type relay, means controlled by said relay for determining the force applied in controlling said craft, variable power means restraining the movement of the movable element of said relay, means for modifying the amount of said power in proportion to the amount of deviation of said craft whereby the force applied in controlling said craft is proportional to the amount of said deviation and the rate of said deviation, and means limiting said modification in proportion to a chosen maximum deviation.

ROBERT ALKAN.